(12) United States Patent
Brody et al.

(10) Patent No.: US 7,720,750 B2
(45) Date of Patent: May 18, 2010

(54) SYSTEMS AND METHODS FOR PROVIDING CONSUMERS ANONYMOUS PRE-APPROVED OFFERS FROM A CONSUMER-SELECTED GROUP OF MERCHANTS

(75) Inventors: Robert M. Brody, Weston, CT (US); Donald W. Binns, Atlanta, GA (US); Reuben S. Kennedy, Duluth, GA (US)

(73) Assignee: Equifax, Inc., Atlanta, GA (US)

( * ) Notice: Subject to any disclaimer, the term of this patent is extended or adjusted under 35 U.S.C. 154(b) by 1708 days.

(21) Appl. No.: 09/737,459

(22) Filed: Dec. 14, 2000

(65) Prior Publication Data
US 2002/0077964 A1    Jun. 20, 2002

Related U.S. Application Data

(60) Provisional application No. 60/170,960, filed on Dec. 15, 1999.

(51) Int. Cl.
G06Q 40/00     (2006.01)
(52) U.S. Cl. ......................................................... 705/38
(58) Field of Classification Search .................. 705/35, 705/38, 39
See application file for complete search history.

(56) References Cited

U.S. PATENT DOCUMENTS

| | | | |
|---|---|---|---|
| 5,136,501 A | 8/1992 | Silverman et al. |
| 5,420,926 A | 5/1995 | Low |
| 5,732,400 A | 3/1998 | Mandler et al. |
| 5,883,810 A | 3/1999 | Franklin et al. |
| 5,940,812 A | 8/1999 | Tengel et al. |
| 5,956,699 A | 9/1999 | Wong et al. |

(Continued)

FOREIGN PATENT DOCUMENTS

EP     1 028 401 A2     8/2000

(Continued)

OTHER PUBLICATIONS

Anonymous, ACI Turns Credit Score Reports into English, Nov. 1999, Origination news, vol. 9, Iss. 2; p. 29, 2pgs.*

(Continued)

*Primary Examiner*—Hani Kazimi
(74) *Attorney, Agent, or Firm*—Kilpatrick Stockton LLP (57) ABSTRACT

The system and method of the present invention provides consumers with credit information including information which can help the consumer evaluate the consumer's credit report or credit worthiness. The present invention can also provide consumers with suggestions to help consumers better their credit rating. The system and method of the present invention also provide consumers with pre-approved credit offers from a consumer-selected group of merchants, where the consumers are anonymous to the merchants, and the merchants do not receive copies of the consumer's credit report. Additional functions of the present invention include allowing users to opt-out or opt-into solicitation lists, and enabling users to automatically monitor their credit report. The present invention offers these services through a third party agent of the consumer which can be accessible to the consumer via the Internet. Through this agency relationship, the third party can request consumer information and determine pre-approved offers from a plurality of merchants while protecting the confidentiality of consumer credit information without negative consequences on a consumer's credit.

16 Claims, 6 Drawing Sheets

U.S. PATENT DOCUMENTS

| | | | |
|---|---|---|---|
| 5,966,699 | A | 10/1999 | Zandi |
| 5,988,080 | A | 11/1999 | Miyoshi et al. |
| 6,006,200 | A | 12/1999 | Boies et al. |
| 6,014,627 | A | 1/2000 | Togher et al. |
| 6,029,149 | A | 2/2000 | Dykstra et al. |
| 6,055,570 | A | 4/2000 | Nielsen |
| 6,088,686 | A * | 7/2000 | Walker et al. ............ 705/38 |
| 6,112,190 | A | 8/2000 | Fletcher et al. |
| 6,119,103 | A | 9/2000 | Basch et al. |
| 6,163,771 | A | 12/2000 | Walker et al. |
| 6,240,400 | B1 | 5/2001 | Chou et al. |
| 6,311,169 | B2 * | 10/2001 | Duhon ............ 705/38 |
| 6,385,594 | B1 | 5/2002 | Lebda et al. |
| 6,405,181 | B2 * | 6/2002 | Lent et al. ............ 705/38 |
| 6,422,462 | B1 | 7/2002 | Cohen |
| 6,505,171 | B1 | 1/2003 | Cohen |
| 6,598,027 | B1 | 7/2003 | Breen, Jr. et al. |
| 6,611,816 | B2 | 8/2003 | Lebda et al. |
| 6,611,819 | B1 | 8/2003 | Oneda |
| 6,622,131 | B1 | 9/2003 | Brown et al. |
| 6,834,270 | B1 | 12/2004 | Pagani et al. |
| 6,925,441 | B1 | 8/2005 | Jones, III |
| 6,938,022 | B1 | 8/2005 | Singhal |
| 7,003,488 | B2 | 2/2006 | Dunne et al. |
| 7,051,006 | B2 | 5/2006 | Tresser |
| 7,069,249 | B2 | 6/2006 | Stolfo et al. |
| 7,117,182 | B2 | 10/2006 | Chess et al. |
| 7,146,337 | B1 | 12/2006 | Ward et al. |
| 7,203,315 | B1 | 4/2007 | Livesay |
| 7,213,032 | B2 | 5/2007 | Mascarenha |
| 7,222,100 | B2 | 5/2007 | Tresser |
| 2001/0011245 | A1 | 8/2001 | Duhon |
| 2002/0007964 | A1 | 1/2002 | Mori et al. |
| 2002/0026345 | A1 | 2/2002 | Juels |
| 2002/0029188 | A1 | 3/2002 | Schmid |
| 2002/0040339 | A1 | 4/2002 | Dhar et al. |
| 2002/0046341 | A1 | 4/2002 | Kazaks et al. |
| 2002/0072975 | A1 | 6/2002 | Steele et al. |
| 2002/0087460 | A1 | 7/2002 | Hornung |
| 2002/0107776 | A1 | 8/2002 | Bove et al. |
| 2002/0116322 | A1 | 8/2002 | Schnall |
| 2002/0133462 | A1 | 9/2002 | Shyteyn |
| 2002/0165815 | A1 | 11/2002 | Vincent |
| 2002/0169747 | A1 | 11/2002 | Chapman et al. |
| 2002/0194122 | A1 | 12/2002 | Knox et al. |
| 2002/0194143 | A1 | 12/2002 | Banerjee et al. |
| 2003/0018568 | A1 | 1/2003 | Chen |
| 2003/0028470 | A1 | 2/2003 | Dutta |
| 2003/0028481 | A1 | 2/2003 | Flitcroft et al. |
| 2003/0036996 | A1 | 2/2003 | Lazerson |
| 2003/0208412 | A1 | 11/2003 | Hillestad et al. |
| 2004/0186806 | A1 | 9/2004 | Sinclair et al. |
| 2004/0205019 | A1 | 10/2004 | Painter et al. |
| 2005/0228748 | A1 | 10/2005 | Togher et al. |
| 2006/0100944 | A1 | 5/2006 | Reddin |
| 2006/0259391 | A1 | 11/2006 | Schoen et al. |
| 2007/0005484 | A1 | 1/2007 | Waelbroeck et al. |
| 2007/0118455 | A1 | 5/2007 | Albert et al. |
| 2007/0299771 | A1 | 12/2007 | Brody et al. |

FOREIGN PATENT DOCUMENTS

| | | |
|---|---|---|
| EP | 1028401 A2 | 8/2000 |
| EP | 1115095 | 7/2001 |
| WO | WO 99/49424 | 9/1999 |
| WO | WO 00/02150 | 1/2000 |

OTHER PUBLICATIONS

Anonymous, A Home Remedy for Bad Credit, Apr. 1996, Credit Card Management v9n1, pp. 14.*

New Privista Product Provides Early Warning System to Combat Identity Theft ID Guard to Build Consumer Confidence, Save Companies in Lost Revenue. (Oct. 23, 2000).

CreditCheck Monitoring Service—Why wonder what your credit report says? With the CreditCheck® Monitoring Service, you'll know! (Dec. 11, 2000).

PrivacyGuard.com Set your records straight (Dec. 11, 2000).

Experian Consumer Center (Dec. 11, 2000).

CreditAbility.com-Trans Union Online Credit Reporting and Monitoring Service (Dec. 11, 2000). http://www.creditability.com/.

Index-Learn—No Waiting No Wondering No Doubts (Dec. 11, 2000). http://www.creditability.com/secondary/lear/iLearn.asp.

Dennis, Sylvia, "Soups Up ID Theft Monitoring Service," Newsbytes, Jan. 26, 2001.

About ID Guard, web.archive.org/web/20011024051700/privista.corn, Jan. 4, 2001.

Jason A. Skinder, "Third-Party Submission of Prior Art in a Published Application per 37 C.F.R. §1.99", Feb. 3, 2006.

Gralla, "How the Internet Works," Millenium Edition, Copyright 1999.

"What will Lenders/Agents bid on?" Bid4Mortgage, Consumer F.A.Q. http://www.bid4mortgage.com/help/consumer-faq 05 pages (Jan. 29, 2008).

Office Action dated Apr. 2, 2009 in related U.S. Appl. No. 11/854028.

\* cited by examiner

FIG. 3
(Credit Scoring)

FIG. 4
(Pre-Approved Offers)

FIG. 5
(E-Privacy)

FIG. 6
(Proof Positive)

SYSTEMS AND METHODS FOR PROVIDING CONSUMERS ANONYMOUS PRE-APPROVED OFFERS FROM A CONSUMER-SELECTED GROUP OF MERCHANTS

CROSS REFERENCE TO RELATED APPLICATIONS

The present invention claims priority of U.S. Provisional Application Ser. No. 60/170,960, filed Dec. 15, 1999 titled "Systems And Methods For Providing Consumers Anonymous Pre-Approved Offers From A Consumer-Selected Group Of Merchants", the contents of which are incorporated entirely herein by reference.

FIELD OF THE INVENTION

The present invention relates generally to consumer credit information and, more particularly, to systems and methods for providing consumers credit information and anonymous pre-approved offers from merchants based upon consumer credit information.

BACKGROUND OF THE INVENTION

Consumer credit information is typically utilized by merchants, such as credit card issuers and banks, to determine the credit worthiness of a consumer. The credit worthiness of the consumer is in turn used by the merchants to determine if the merchants will enter into a transaction with the consumer. In many instances, the merchant may be a lender which determines if it will enter a loan transaction with the consumer, what amount it will lend to the consumer, and the terms of the transaction, such as interest rate, based upon consumer credit information. To receive merchant offers, consumers must give merchants permission to look at the consumer's credit information, such as credit reports maintained by credit bureaus, such as Equifax, TransUnion and Experian. The credit reports maintained by these credit bureaus contain information regarding the consumer's credit, such as outstanding accounts, account balances, and other relevant information such as accounts placed for collection by creditors.

In a typical consumer-merchant transaction, the merchant receives permission from the consumer to view consumer's credit report. A consumer's consent to allow a merchant to view the consumer's credit report, however, can have a negative effect on the consumer's credit rating. This is due to the credit inquiry being merchant driven, along with the general proposition that the higher number of accounts a consumer may have or apply for, the higher risk that the consumer will default on one or more credit transactions. In addition to utilizing the consumer's credit information to determine the consumer's credit worthiness for the purposes of the merchant's own transaction, the merchant can use the consumer's credit information for other purposes, such as future solicitations.

With the increase of electronic transactions, credit reports are becoming increasingly important in evaluating consumer transactions. Where consumers were once judged on a combination of subjective and objective information, today credit reports are increasingly used as the sole or primary criteria used by lenders and merchants to evaluate the credit worthiness of a consumer. And although consumer credit reports are becoming increasingly important, consumers presently do not have readily available up to date information regarding their credit, as well as information indicating what factors help or hurt consumer credit ratings. Furthermore, consumers often do not understand how lending decisions are made based upon credit, credit scores, and what components can contribute to credit scores. Currently, consumers can often only receive information regarding negative items listed on their credit report through being denied credit. Even after being denied credit, the consumer may only then be provided standard statements as to the items that led to the deny of the credit or loan, such as too many recent new accounts, or too many accounts having high balances.

What is needed is a system and method enabling consumers to obtain up to the date credit information, including customized information that helps consumer evaluate positive and negative aspects of their credit report, as well as how the consumer can go about improving their credit rating. Moreover, what is also needed is a system and method that allows consumers to receive pre-approved offers from merchants, where the merchants do not make merchant inquiries into the consumer's credit report that can negatively affect the consumer's credit rating. A system and method for obtaining pre-approved offers would also be advantageous where the merchants can provide consumers offers without seeing the consumer's credit report so the consumer's credit report can be maintained in confidence. Finally, it would be advantageous for the consumer to be able to obtain credit report information and merchant offers through a trusted third party agent that can receive the consumer's credit data, maintain the data in confidentiality, receive merchant criteria for pre-approved offers, and identify to consumers those merchants offers for which the consumer has been pre-approved.

SUMMARY OF THE INVENTION

The systems and methods of the present invention provide consumers with credit information including information which can help the consumer evaluate the consumer's credit report or credit worthiness. The present invention can also provide consumers with suggestions to help consumers better their credit rating. The systems and methods of the present invention also provide consumers with pre-approved credit offers from a consumer-selected group of merchants, where the consumers are anonymous to the merchants, and the merchants do not receive copies of the consumer's credit report. Additional functions of the present invention include allowing users to opt-out or opt-into solicitation lists, and enabling users to automatically monitor their credit report. The present invention offers these services through a third party agent of the consumer which can be accessible to the consumer via the Internet. Through this agency relationship, the third party can request consumer information and determine pre-approved offers from a plurality of merchants while protecting the confidentiality of consumer credit information without negative consequences on a consumer's credit.

According to one embodiment of the present invention, a method for providing a consumer with personalized credit-related information based on credit history data of the consumer is disclosed. The method includes creating an account with the consumer, receiving a request from the consumer for personalized credit-related information, and transmitting to a credit bureau, in response to the request from the consumer, an inquiry for credit history data relating to the consumer. The method further includes receiving credit history data on the consumer in response to the inquiry, generating a summary report of personalized credit-related information based on the credit history data, the summary report including a credit score and an explanatory statement suggesting steps to improve the credit score, and transmitting the summary report to the consumer.

According to one aspect of the method of the present invention, creating an account includes establishing an agent relationship with the consumer so that transmitting an inquiry includes transmitting a Fair Credit Reporting Act Consumer Disclosure Inquiry for the consumer to the credit bureau.

According to the method of the present invention, generating the summary report can include generating the credit score based on the credit history data. Furthermore, the method of the present invention can include receiving consumer-related records from a plurality of databases on one or more networks, wherein generating the credit score includes generating the credit score based on the credit history data and at least one of the consumer-related records which is associated with the consumer. Additionally, receiving the request of the consumer can include authenticating the consumer.

According to another embodiment of the present invention, a method of providing one or more pre-approved offers to a consumer based on credit-related information of the consumer is disclosed. The method of providing one or more pre-approved offers can include creating an account with the consumer, transmitting to a credit bureau an inquiry for credit history data relating to the consumer, receiving credit history data on the consumer in response to the inquiry, and selecting a pre-approved offer from a plurality of offers from multiple merchants based at least partially on the credit history data of the consumer. The method can further include presenting the offer to the consumer, where the offer is for establishing a credit-based account with a merchant.

According to one aspect of the invention, presenting the offer can include displaying a selectable item on a web page viewable by a web browser interface. Furthermore, identifying the pre-approved offer can include receiving an offer from a merchant with merchant define criteria for selection of a suitable consumer, and selecting the offer based at least partially on the criteria provided by the merchant.

According to another aspect of the invention, presenting the pre-approved offer can include presenting the pre-approved offer for acceptance by the consumer, wherein the pre-approved offer is anonymously pre-approved based on a comparison of the credit history data of the consumer and the criteria provided by the merchant. The step of creating the account can also include receiving preference criteria from the consumer, and selecting the pre-approved offer can include selecting the pre-approved offer from a merchant based at least partially on the preference criteria of the consumer. Additionally, selecting the pre-approved offer can include selecting the pre-approved offer from a merchant based at least partially on market activity of the consumer.

According to yet another aspect of the invention, selecting the pre-approved offer can include determining a financial term of the pre-approved offer based at least partially on the credit history data of the consumer. Moreover, the method of the present invention can further include selecting a plurality of pre-approved offers for the consumer based at least partially on the credit history data of the consumer and a subject preference provided by the consumer.

According to another embodiment of the present invention, a method for presenting pre-approved offers to a consumer is disclosed. The method includes receiving consumer data records from a plurality of databases, selecting for the consumer at least one pre-approved offer based on at least one consumer data record associated with the consumer, and sending a web-based representation of the pre-approved offer to the consumer. According to one aspect of the present invention, receiving the consumer data record can include receiving at least one of credit history report associated with the consumer and at least one consumer data record associated with the consumer. Furthermore, selecting the pre-approved offer can include selecting the pre-approved offer based at least partially on the credit history record.

According to one aspect of the invention, the method can further include receiving an offer acceptance indication from the consumer in response to the representation of the pre-approved offer. Additionally, selecting the pre-approved offer can include determining a financial term of the pre-approved offer, and comparing at least one consumer data record with modeling criteria provided by the merchant.

According to another embodiment of the invention, a method is disclosed for opting a consumer out of or into targeted marketing programs that distribute targeted marketing items from a plurality of merchants. According to the invention, the method includes receiving at a webpage interface opt-out or opt-in criteria inputted by the consumer, and notifying at least one of the plurality of merchants and a direct marketer to cease sending targeted marketing items to the consumer based at least partially on the opt-out criteria. The method can also further include selecting the merchant to notify based at least partially on satisfaction by the merchant of the opt-out or opt-in criteria of the consumer.

According to one aspect of the invention, receiving opt-out or opt-in criteria can include receiving an indication of a subject matter for which the consumer is opting out or opting in and/or receiving an indication of a merchant for which the consumer is opting out or opting in. Furthermore, receiving opt-out or opt-in criteria can include receiving an indication of an inclusive listing of merchants for which the consumer is opting out or opting in.

According to yet another embodiment of the present invention, a method for monitoring credit report activity for a consumer is disclosed. The method includes detecting a change in a credit report of the consumer, and sending a message to the consumer if the credit report has changed to notify the consumer of a credit report activity associated with the credit report of the consumer. The method can further include creating a credit monitoring account with the consumer, and receiving a request at a webpage interface from the consumer to view a representation of the credit report change. Additionally, the method can include transmitting an inquiry to a credit bureau for a credit report of the consumer, receiving in response to the inquiry a credit report on the consumer, identifying an item of the credit report that has changed, and generating a representation of the credit report activity based on the item of the credit report that changed.

According to the method of the present invention, the method can further include storing credit-related information based on the credit report of the consumer, wherein identifying the item of the credit report that has changed includes retrieving the stored credit-related information, and comparing the credit related information with a representation of the credit report. According to the invention, identifying the item can include identifying an item selected from the group consisting of a credit score, a number of inquires, a consumer demographic data and any other statistical data retrieved from a data source. The method can further include receiving in response to the inquiry a credit report on the consumer, and presenting the consumer with a pre-approved offer for a credit-based account, the consumer being pre-approved based at least partially on the credit report of the consumer.

According to another aspect of the invention, the method further includes receiving in response to the inquiry a credit report on the consumer, generating a summary report of personalized credit-related information based on the credit report, the summary report including a credit score of the consumer and an explanatory statement suggesting steps to improve the credit score, and presenting the consumer with the summary report. Finally, according to the method of the present invention, sending the message may include determining an impact of the change in the credit report of the consumer on the credit worthiness of the consumer.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

According to one embodiment of the present invention, a system and method for enabling users to receive pre-approved offers from merchants is provided. The system and method of the present invention allow users to access the system via the Internet. According to another embodiment of the present invention, consumers can receive personalized credit-related information, opt-out of targeted marketing programs that distribute marketing materials from one or more merchants, and monitor their credit report activity. First, a system enabling these functions to occur will be described. Thereafter, these functions will be described in detail.

Systems of the Present Invention

Figure 1:
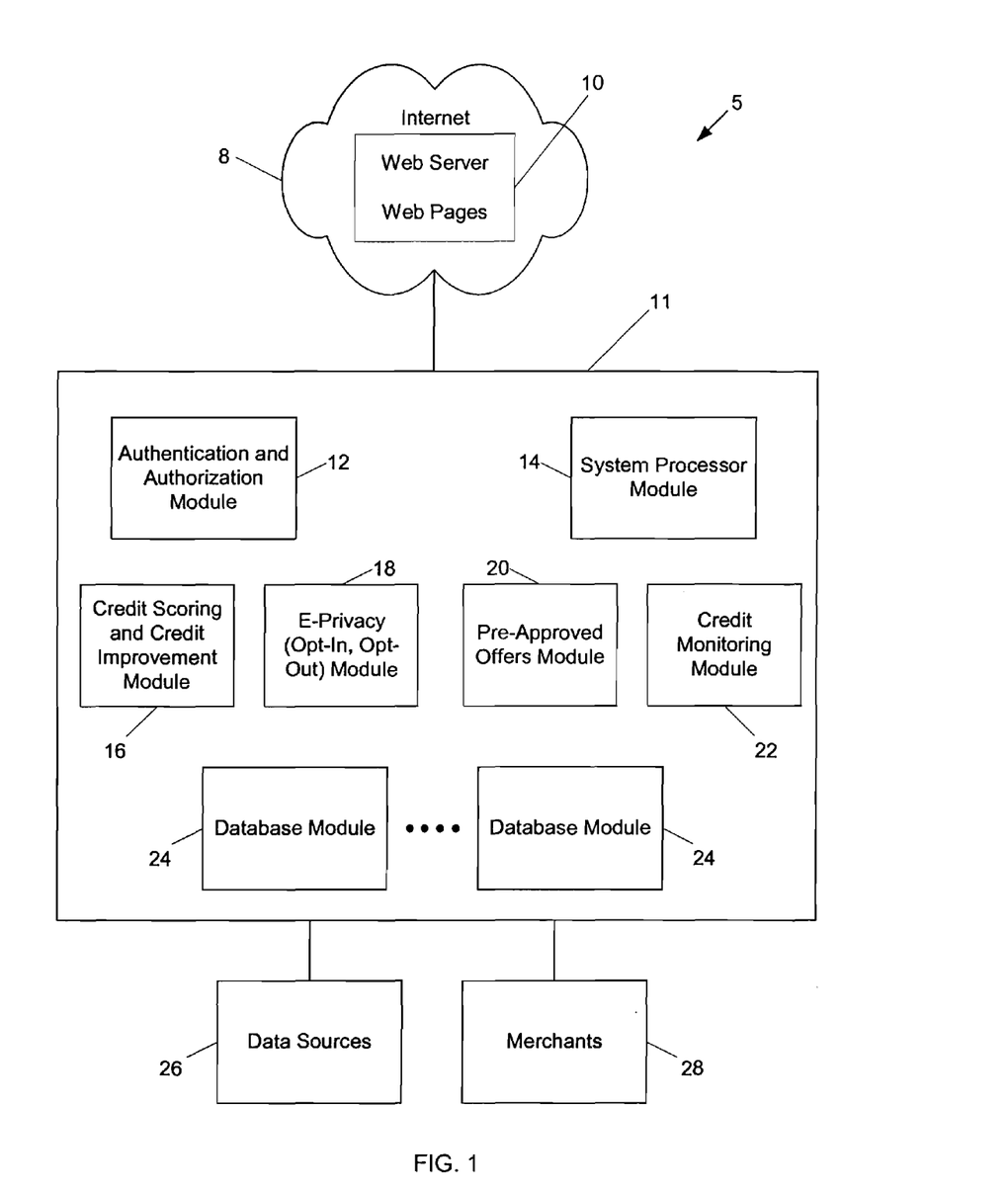
FIG. 1 shows a block diagram of a system according to one embodiment of the present invention.

FIG. 1 shows a block diagram of a system according to one embodiment of the present invention. The system 5 of the present invention is illustrated in block diagram form because any number of components in any combination can be used to produce the system, as will be appreciated to one of ordinary skill in the art. Generally, the system 5 includes a web server 10, including one or more web pages accessible to consumers via the Internet 8. The function of the web pages are controlled by the control module 11, which is in communication with one or more data sources 26 and merchants 28. It will be appreciated that the control module 11, web server 10, data sources 26 and merchants 28 can be in communication by any well known means in the art, such as via the Internet, telephone lines, cable lines, dedicated lines, or any other suitable means of communication.

The control module 11 includes a number of submodules used to implement the system of the present invention, including an Authentication and Authorization module 12, a system processor module 14, a credit scoring and credit improvement module 16, an E-privacy module 18, a pre-approved offers module 20, a credit monitoring module 22, and one or more database modules 24. Although many of the submodules contained within the control module 11 are illustrated as one module, it will be appreciated that the function of any one modules may also be implemented through a plurality of submodules, or in aggregate with the functions of other submodules. Furthermore, each of the submodules represents a function of the system 5 that may be implemented through a combination of computer hardware and software. For instance, the control module 11 can be resident on a computer local to the system 5 and submodules, which preferably comprise software code, can be programmed using any well known language to result in the functions of the system, as will be explained in great detail below.

The purpose of the Authentication and authorization module 12 is to register consumers accessing the system 5 via the Internet 8. Consumers, as discussed herein, may include individuals, businesses or other entities. Although consumers will be used herein to refer to individual consumers, it will be appreciated that the present invention can be utilized by all types of consumers, such as small businesses. The authentication and authorization module 12 registers consumers so that the consumers can be identified by the system 5, which is required for the system 5 to accomplish many of the functions of the system. The tasks of the control module 11 and system 5 are generally controlled by a system processor module 14, which can include storage memory and an operating system connected to the other modules of the system (although not illustrated in FIG. 1) through means such as a system bus.

The credit scoring and credit improvement module 16, e-privacy module 18, pre-approved offer module 20, and credit monitoring module 22 accomplish the primary consumer credit functions of the present invention in combination with the other submodules represented in FIG. 1. The functions of each of these submodules are explained in detail below. Briefly, however, these submodules enable consumers to obtain their credit information, along with information as to how to improve their credit, allow consumers to opt-in or opt-out of solicitation lists, permit consumers to obtain anonymous pre-approved offers from merchants where the merchants do not access the consumers' credit information through merchant inquiries, and permit the consumer to monitor the status of the consumer's credit information. The control module 11 also includes one or more database modules 24 for storing consumer profiles, such as consumer names, social security numbers, and other relevant data, along with historical information regarding consumer credit information.

The control module 11 is in communication with one or more data sources 26 and merchants 28. The data sources provide the system 5 of the present invention with the credit information and/or statistical data and/or consumer-related data to enable the system 5 to offer the functions to consumers described above. For example, where consumers wish to obtain information regarding their credit report, the control module 11 requests and receives this credit report information from one or more data sources 26. The merchants 28 are also in communication with the control module 11 such that consumers can receive pre-approved anonymous offers from the merchants 28 via the system 5. For example, where a consumer's credit information is obtained from one or more data sources, the system and method of the present invention can receive merchant criteria for the establishment of pre-approved offers. The control module 11, through a combination of one or more submodules, compares the merchant defined criteria to the consumer's credit information to produce pre-approved consumer offers. This can be done without the merchant knowing any information about the particular consumer, as will be described in detail below.

It will be appreciated by those of skill in the art that the submodules illustrated in FIG. 1 can be connected in any combination in a conventional manner. Furthermore, one or more of the submodules may be combinable, and each submodule can be replicated so that a plurality of each submodule, each performing the same function, may be used to scale the system of the present invention. As stated above, the modules may be implemented using any combination of conventional computer hardware and software, as will be described below with reference to FIGS. 2-6.

Figure 2:
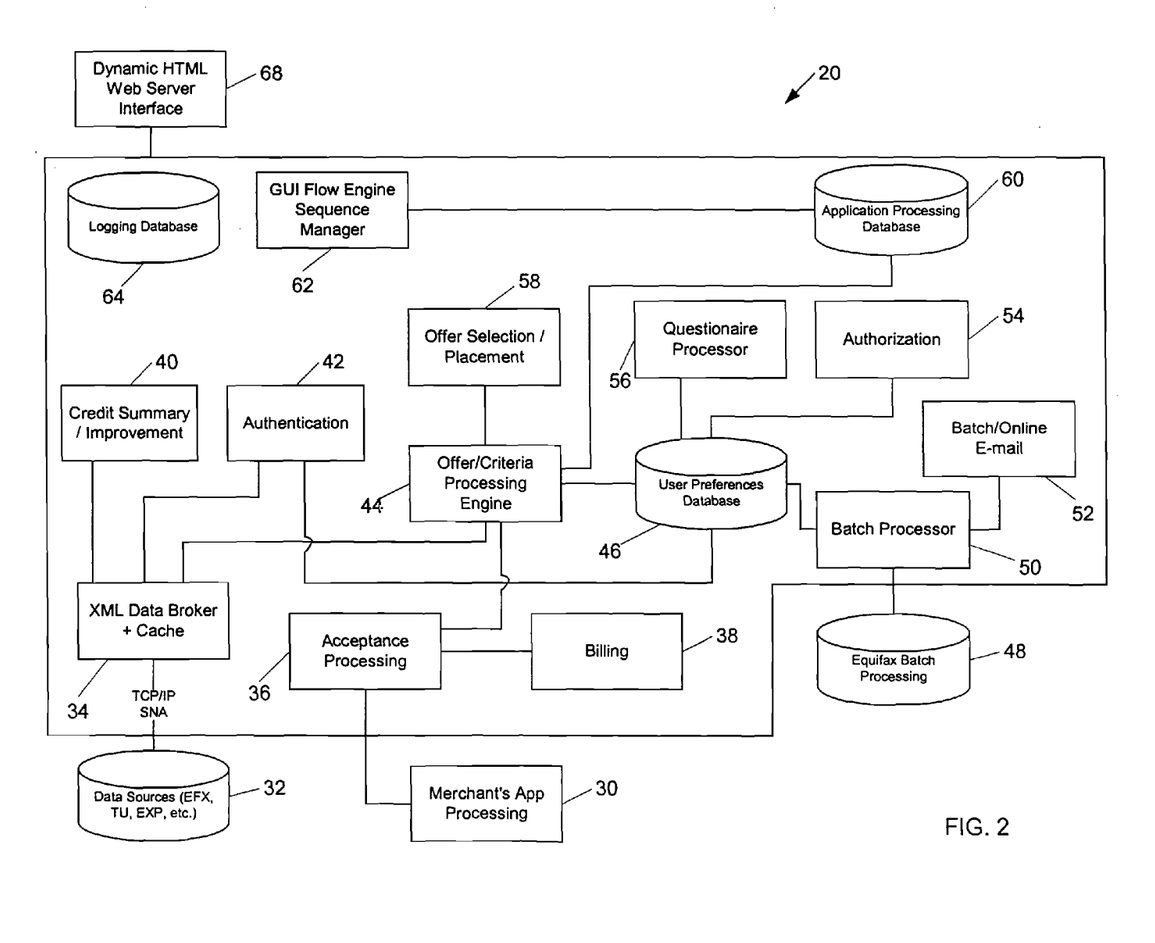
FIG. 2 shows a block diagram of a system according to another embodiment of the present invention.

FIG. 2 shows a block diagram of a system according to one embodiment of the present invention. The system illustrated in FIG. 2 is consistent with the system illustrated in FIG. 1 in that it comprises a web server module 68, data sources 32, and merchants 30, each of which are in communication with a control module 31 of the system 20. Like the elements of FIG. 1, each of the elements of FIG. 2 can be implemented using known computer and software elements suitable to accomplish the functions of the systems and methods of the present invention described herein.

As illustrated in FIG. 2, the data sources 32 can represent credit bureaus (Equifax, TransUnion, or Experian), or other data providers (e.g., Polk, metro mail, database technologies, or any other data provider) that provide the system 31 with credit or statistical or consumer-related data useful in employing the functions of the present invention, as described below. For example, the data sources 32 may provide the system information such as whether a consumer subscribes to a particular magazine, the Zipcode of the customer, the consumer's marital status, vehicle type, census data, sex offender status, or any other data useful in consumer credit transactions. The data sources 32 can be connected to the control module 31 in a variety of ways, such as TCP/IP or system network architecture (SNA), although additional suitable connection methods as are well known in the art can be employed. These connections are preferably secure such as nonpublic, non-Internet lines, such as a lease line or a frame relay connection, or strongly encrypted public lines because sensitive consumer credit information may be transmitted via these connections. Furthermore, these lines can also be internal to the system where the data sources 32 are local to the system 20 or control module 31. For example, where the control module 31 is located within the data source 32, the lines may be totally internal to the system 20.

The data sources 32 are connected via the communication lines to a data broker cache 34. This data broker and cache 34 stores credit reports or other information received from the data sources 32, along with any information transmitted to the data sources 32, so that when a return consumer accesses the system 20, another credit report corresponding to the consumer is not requested and retrieved from the data sources 32. Instead, an earlier stored credit report can be retrieved. Therefore, the data broker and cache 34 can prevent unnecessary access and requests to the data sources 32, which can be expensive. For example, where a data source 32 is a customer credit report, the data source (e.g., credit bureau) may charge for that report.

The data broker and cache 34 can also convert any information received from the data sources 32 into a particular language, such as XML. The conversion of data is necessary because the data is retrieved from the data sources 32 can be in any form. It is likely, furthermore, that data received from multiple data sources 32 are in different forms. As such, the data cannot be easily manipulated and compared to other data. Therefore, all the data retrieved by the system is converted to a common format such as XML, as is well known to those of skill in the art. The data broker and cache 34 can be maintained on local or non-local hardware, such as a UNIX system, upon which the control module 31 may be based. Because data is pulled through the data broker and cache 34, the data broker and cache 34 can also function as a requester and a broker. The data broker and cache 34 can determine what type of information must be submitted to a data source 32 to retrieve any necessary information, and can determine that the information is already stored such that a request to a data source 32 is not required. The data broker and cache 34 can also maintain data for a period of time (e.g., a week, month, whatever duration the system administrator requires). As such, the data broker and cache can include some type of database, such as Oracle.

The offer processing engine 44 illustrated in FIG. 2 relates primarily to the pre-approved offer function of the present invention. The offer processing engine 44 stores merchant offers and configuration information enabling the system to produce real time updates on merchant offers made to consumers via the system 5. For example, according to one aspect of the invention, the offer processing engine 44 identifies and retrieves the identity of one or more consumers seeking a subcategory of loans via a user selectable graphic interface, as will be described in detail below. The offer processing engine 44 can also retrieve data from the data broker and cache 34 that represents a consumer's credit data, and can retrieve configuration data, such as the pre-approved offers a consumer is viewing. Additionally, the offer processing engine 44 can store preference information regarding merchants, such as placement of pre-approved offers made to consumers by merchants, along with the category the merchant's offer falls into so that a consumer can select the types of offer the consumer wishes to receive. Also included within the system 20, as described in more detail below, is an offer selection and placement module 58, which can determine the manner in which pre-approved offers are presented to the consumer.

The acceptance processor 36 also relates to the pre-approved offer function of the present invention, which is described below. When a consumer accepts a pre-approved offer made to the consumer by a merchant, the acceptance can be transmitted via a well known method, such as TCP/IP, SNA, or HTTP post, to the merchant, and more specifically, to the merchant's application processing system 30. Once an offer is accepted by a consumer, the acceptance processor 36 determines how to route the acceptance to the correct merchant, what data is needed to be sent to the merchant, and what data is retrieved back from the merchant. The acceptance processor 36 may also be in communication with the offer processing engine 44 and data broker and cache 34. Through these connections, the acceptance processor 36 can determine what type of information the merchants' application processing system 30 will require, including the data format required by the merchant. Therefore, the data format, which may be XML at any point within the control module 31 of the system 20, can be converted into any data format usable to the merchant, or a data format requested by the merchant. This data communication to the merchant can also be a batch process. For example, every midnight acceptance information is sent to the merchant. This process could also occur online, so that an account number is immediately given to the consumer so that the consumer can instantly use the account.

The data broker and cache 34 is also in communication with the credit scoring and credit improvement module 40, which receives data files from data source 32. The function of the credit scoring and credit improvement module 40 is discussed in detail below. Also illustrated in FIG. 2 is an authentication module 42, which can require credit files to authenticate a consumer accessing the system 20. As described below, this module can authenticate consumers based upon their credit information, and/or according to a user ID and password provided to consumers. Furthermore, the authentication module 42 can be used to select an appropriate data source file (Equifax credit file) where a data source 32 returns more than one file for a consumer, because multiple consumers may be identified by information provided by the data source 32.

According to the embodiment illustrated in FIG. 2, yet another component within the control module 31 is a consumer preferences database 46, which stores consumer preferences such as the consumer's wish to opt-out or opt-in to solicitation lists, as described in greater detail below. The consumer preferences database 46 can also maintain profiles on a consumer so that specific offers ads, or other information can be presented to a consumer upon that consumer's initial log-in to the system 20. The control module 31 also includes a logging database 64 located in the control module 31. Although not shown as in communication with other components of the system, the logging database 64 can be connected to any or all of the components within the system 20, like the other components described herein. The logging database 64 can store historical information regarding traffic on the system and statistical information. In this manner, an administrator of the system 20 of the present invention can determine the traffic on the system, how many offers to consumers have been presented, how many were accepted, hit rates, and other useful statistical information. This is useful in attracting or reporting traffic on the system to merchants making offers via the present invention. For example, according to one aspect of the present invention, a system administrator of the present invention can provide merchants with information regarding the number of times the merchant's offer has been communicated to consumers. Additionally, for example, the system administrator can inform the merchant that the merchant's offer is not competitive where the merchant's offer has been shown thousands of times but no consumers have accepted the offer. Furthermore, the logging database 64 can be useful where a consumer accepts a transaction such as a pre-approved offer. Where this occurs, the system 20 of the present invention may recreate the transaction, including information such as the particular offer at a given point in time, the consumer's credit information at that time, and whether the transaction occurred accurately.

Also located within the system 20 is a billing database 38 that communicates with the acceptance processor 36. Like the acceptance processor, the billing database may be utilized in conjunction with the pre-approved offers function of the present invention. When a consumer accepts a pre-approved offer, the system 20 can determine the merchant who must pay a royalty, the amount of the royalty, and other useful billing or accounting information. After an accept of the transaction, a record of the transaction will be forwarded to billing database 38 and the merchant's application processing module 30. The merchant can be billed immediately or on a periodical basis. And where the transaction is not automatically accepted, the merchant may not be billed until the merchant responds with an acceptance.

The web server and web sites 68 accessible to consumers via the Internet enable the consumer to utilize the functions of the system and methods of the present invention. According to one aspect of the present invention, one or more web sites can be marketed to a number of different domain names, tailored to different markets, and can include totally independent web-sites each having their own pages. Furthermore, the web sites can be established as co-branded web sites, if the web sites are promoted in conjunction with another web page or portal, such as Yahoo. The web server and web page module 68 illustrated in FIG. 2 may be based upon market servers, and within the module there may exist software and/or hardware that interfaces with other components of the system 20 using dynamic HTML and TCP/IP interfacing. The webserver can be maintained at any location, and can be outsourced to an ISP, such as Mindspring.

Referring again to components located within the control module 31, there is a graphical user interface (GUI) flow engine 62, preferably located outside of the webserver. The GUI flow engine 62 enables consumers to enter information, has rules which guide the consumer's interaction with the web page (i.e., you click on this, you go there) and enables sequences of events that allow transactions to occur. For example, for any type of transaction, the GUI 62 can determine the components within the system 20 which need to be accessed, and the order in which the components are accessed. The GUI flow engine 62 and application processing database 60 can work in conjunction to provide a data driven method of controlling the application flow and graphical user interface. This will allow an administrator of the system to dynamically configure the sequence of events, modules, and web pages that need to be pieced together in order to perform the desired functions. For example, according to the credit summary and credit improvement function of the present invention, entries may be added into a database that corresponds to the Authorization module 54 and credit record retrieval, the credit summary module 40, and the associated web pages and data elements required to perform any specified tasks. These entries will provide the order of operations and guide the processing flow of the system.

Also located within the system are components enabling consumers to monitor their credit report activity, each of which are described in detail below. To accomplish this monitoring function, a batch processor 50 accesses the consumer preferences database 46 and retrieves a list of registered consumers. The batch processor 50 retrieves enough information to do a consumer inquiry. For instance, the batch processor may retrieve information such as a consumer's address and social security number. Thereafter the batch processor 50 transfers a file containing one or more consumers' information to a credit bureau, such as Equifax, on a predetermined basis, such as weekly. The credit bureau can then processor the batch using a batch processor 48, which can be located on the credit bureau's customer marketing services (CMS) system. The credit bureau batch processor 48 will pull data such as the number of accounts a consumer has open, the number of credit inquiries made to that consumer's credit report in the last seventy days, what the consumer's current address is, the consumer's total revolving balance, Beacon score, fraud alert information, or any other relevant data. This can occur via file transfer protocol, wherein a file is transmitted to the credit bureau, updated by the credit bureau, and retransmitted back to the batch processor 50 located local to the control module 31. Thereafter, the system 20 can review the file and note changes to made to the file. Any important changes can be flagged, and the consumer notified via e-mail, mail, or upon accessing the web site. This can occur via a Batch/Online E-mail module 52. It is preferred that the consumer access the web site to obtain such information so that the customer returns to take advantage of other web site offers. A consumer's most recent profile will probably be maintained, however historical activity could also be stored such that trends in a consumer's credit rating can be determined.

It will be appreciated by one of ordinary skill in the art that multiple transactions can occur simultaneously using the system of the present invention. Furthermore, according to one aspect of the present invention, there can be multiples of any one of the components or modules described herein, which can be useful for establishing redundancy.

Access and Account Establishment of the Present Invention

According to one embodiment of the present invention, consumers can access the system of the present invention in a variety of manners. Consumers can access the system through an Internet connection and one or more associated Internet web pages or portals, using a computer having a communications device, such as a modem, and a consumer interface, such as an Internet browser. Alternatively, consumers can access the system through one or more computer terminals in local or non-local communication with the system through public or private (dedicated) communication channels. Additionally, consumers can connect to the system through a direct dialed number using computers having suitable communications devices well known to those of skill in the art. Nonetheless, it is preferred that the system of the present invention be established and accessible through the Internet, as the Internet offers convenient access to the greatest number of consumers. Therefore, while consumers can access the system in a variety of manners, the present invention will be described herein in reference to consumers accessing the system via the Internet and one or more Internet web pages.

As the system and method of the present invention provides benefits to all consumers, the system should be accessible via a variety of web pages and/or servers that are accessible to the general public. Although one web page, having one domain name, may be used to access the system of the present invention, it is preferable that the system be accessible via a plurality of web pages or portals, each having their own respective domain name. For instance, according to one aspect of the present invention, multiple web pages can be created and maintained on one web server established by an Internet Service Provider, where the web pages each function independently of each other. Alternatively, web pages may also be created which have unique web pages, but share common functions and code with respect to some portions of the system. For example, the first web page accessed by a consumer may be unique to a particular web page, but further pages accessed through the particular web page may be common to all the established web pages. Furthermore, multiple domain names may be used to access one web page enabling a consumer to access the system of the present invention. For instance, a consumer may enter a plurality of Internet destination addresses, each of which route the consumer to the same destination page.

Regardless of the number of web pages established to access the system, or the manner in which consumers are directed to the system, consumers can utilize the benefits of the system using simple graphical user interfaces. Such interfaces may be implemented through any means known to those of skill in the art, such as through HTML programming. Via a plurality of graphical interfaces users can select functions offered by the system of the present invention. The functions accessible through such interfaces include obtaining anonymous pre-approved credit offers from merchants, obtaining information on a consumer's credit worthiness, opting out of or into consumer targeted marketing programs, and monitoring credit report activity. Prior to accessing these functions through web page interfaces, however, consumers will typically have to identify themselves to the system.

Upon accessing the system of the present invention, such as via an Internet web page, a consumer can establish an account with the system so that the system can accurately identify the consumer in transactions as well as the next time the consumer wishes to access the system. Because the system of the present invention will give the consumer classified information regarding the consumer's credit worthiness, including credit information received from the consumer's credit files, the system should ensure accurate identification of the consumer. After new consumers to the web site and system indicate that they want to set up an account, such as through a hyper-link or button on a web page, the new consumers can be asked a series of questions so that they may be accurately identified. These questions can query the consumer for information such as the consumer's address and social security number (if applicable), as well as other relevant data. This information may be entered by the consumer using one or more window frames that enable the consumer to type in the relevant consumer information. As will be appreciated below, the information received from the consumer may be extensive and exhaustive so that the consumer can be accurately identified and offered customized service based upon one or more aspects of the consumer's profile. After entering the relevant data, the data may be stored by the system in a consumer profile database, and the consumer offered an identification number and password. The identification number and password can be unique to the consumer and stored with the consumer's consumer profile so that the consumer's information can be determined based upon the identification number and password next time the consumer accesses the system. The identification number and password can be given to the consumer via the web site immediately after the consumer sets up the account. Alternatively, the consumer's password can be sent to the consumer via E-mail, or via regular mail to minimize the probability of unauthorized interception of the identification number and password.

In addition to asking the consumer to input a consumer identification number and password, the system of the present invention can question consumers using multiple choice questions to help identify the consumer. For example, consumers accessing the system could be asked to select out of a list of credit cards all of those which they have. Another example of a multiple choice question the consumer may be asked is who financed the consumer's auto loan or mortgage. The multiple choice answers can be chosen from information obtained from the consumer's credit report, or from other information retrieved or known about the consumer. According to one aspect of the invention, identifying the consumer can be a two step process, where the consumer is initially identified by name, address and social security number, the consumer's credit report received, and the consumer is then asked multiple choice questions regarding information taken from the consumer's credit report or other information sources.

The authorization and authentication of new consumers to the system can be performed by the authentication and/or authorization modules, discussed with respect to FIGS. 1 and 2, above. Where new consumers initially access the system, the authentication module may query the consumers to identify the consumer. However, where a consumer can identify themselves as already having been authenticated, the authorization module can receive the consumer's identification number and password, or ask the consumer other information to accurately identify the consumer.

After consumers have appropriately identified themselves to the system of the present invention, the system offers the consumers selectable options the consumers can choose. The options accessible to the consumers through one or more web pages on the system include obtaining anonymous pre-approved credit offers from merchants, obtaining information on a consumer's credit worthiness, opting out of or into consumer targeted marketing programs, and monitoring credit report activity.

In the following description, FIGS. 3-6 are flowchart illustrations of methods and systems according to the present invention. It will be understood that each block of the flowchart illustrations, and combinations of the blocks in the flowchart illustrations, can be implemented by computer program instructions. These computer program instructions may load onto a computer or other programmable apparatus to produce a machine, such that the instructions will execute on the computer or other programmable apparatus to create means for implementing the functions specified in the flowchart block or blocks. These computer program instructions may also be stored in a computer-readable memory that can direct the computer or other programmable apparatus to function in a particular manner, such that the instructions stored in the computer-readable memory produces an article of manufacturing including instructions which implement the function specified in the flowchart block or blocks.

The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the function specified in the flowchart block or blocks.

Accordingly, blocks within the flowchart illustrations support combinations of means for performing the specified functions and combinations of steps for performing the specified functions. It will be understood that each block of the flowchart illustrations, and the combinations of blocks in the flowchart illustrations, can be implemented by a special purpose hardware-based computer systems which perform the specified functions or steps, or combinations of special purpose hardware and computer instructions.

Credit Scoring Function of the Present Invention

Figure 3:
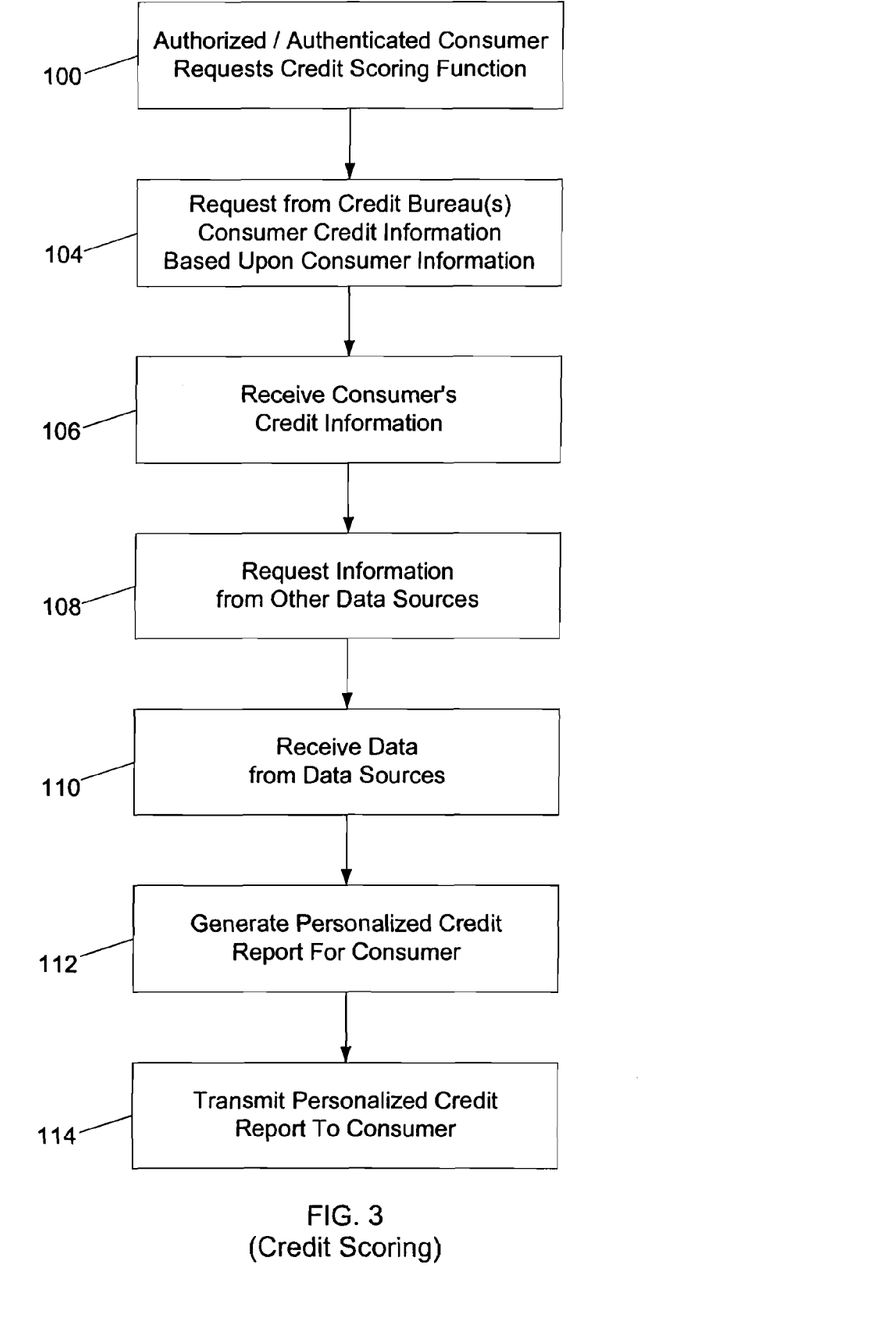
FIG. 3 shows a flowchart illustrating the credit scoring function of the present invention, according to one embodiment of the present invention.

Referring now to FIG. 3, a flow chart illustrating the credit scoring and credit improvement functions performed by the system and method of one embodiment of the present invention is illustrated. According to one aspect of the invention, after a consumer inputs the requisite identification information and an account for the consumer is created by the system, the consumer can request to receive personalized credit related information based upon the credit history of the consumer (see block 100). Based upon information received from the consumer, the systems and methods of the present invention can transmit to a credit bureau an inquiry for credit history data relating to the consumer (see blocks 104, 106). The information transmitted to the credit bureau may contain only data required to retrieve a credit report on the consumer, such as the consumer's name, address and social security number. Therefore, all the data stored in the consumer profile need not be transmitted to the credit bureau. According to one aspect of the invention, the system of the present invention can request credit reports from any credit bureau, including Equifax, TransUnion, or Experian. This request may be made via private communication lines or via public paths, such as via the Internet.

After the present invention receives credit history data from one or more credit bureaus (see block 106), the system and method can generate a summary report of personalized credit-related information (see block 112) based on the consumer's credit history data. The summary report can include a credit score, such as a Beacon, TRW/FICO or Empirica credit score. Additionally, the summary report can include one or more explanatory statements suggesting steps to improve the credit score. These explanatory statements can originate from the credit bureaus, or can originate from the system and be based independently upon specific data contained within the consumer's credit report. This summary report can be transmitted to the consumer (see block 114) via a web page, via e-mail, via standard mail, or via any other means of communication, such as a telephone call.

In addition to receiving information from credit bureaus, the present invention can also request data based upon the consumer's profile from other data sources (see blocks 110, 112). This information can be used to supplement the consumer's personalized credit history, or may be used internally by the system to rate the consumer and to determine offers presented to the consumer, as discussed in detail below. Practically any statistically provable or consumer-related data may be accessed and used. For example, the system can request from a data source the average price of a home in the consumer's Zipcode, which may help indicate the wealth of a consumer, or affect statistical data indicating the consumer's propensity to pay bills on time. According to another example, the present invention could request data from a data source storing information on consumers' magazine subscriptions and magazine subscription sign-up rates. For example, if the consumer receives a magazine entitled 'CEO Monthly", the system could possibly use this information to favorably evaluate the credit of the consumer. Furthermore, the data that may be requested could be retrieved from data sources such as a census report. In addition to retrieving data from data sources, the data used to determine a consumer's credit score can also be based upon consumer input data, such as the consumer's income or the consumer's marital status, for example. In sum, practically any data can be retrieved by the systems and methods of the present invention in determining a personalized credit score of a consumer. Although the consumer's credit report may preferably be weighed more heavily than other factors in determining the consumer's personalized credit score, any combination of data could be used to determine the consumer's personalized credit score.

According to one aspect of the invention, the system's inquiry to the one or more credit bureaus can be considered a consumer inquiry (according to the Fair Credit Reporting Act) rather than a merchant inquiry or promotional inquiry. As will be appreciated to one of skill in the art, merchant inquiries for consumer credit reports can be recorded on the consumer's credit report, and actually count against consumers' credit scores. For example, Fair Issac and Company (FICO) scores, which are standard industry scores, can be negatively affected by a large number or merchant inquiries because the consumer is judged to request quite a few of new credit accounts, and credit statistics show that the more accounts a consumer carries, the more likely that consumer is to default on one of those accounts. Promotional inquiries are also not preferred according to the method and system of the present invention. Although promotional inquired do not typically have a negative affect on a consumer's credit score, promotional inquiries can retrieve only partial information regarding a consumer's credit. Consumer inquiries, on the other hand, provide the consumer a full glimpse at the consumer's credit report without negative credit rating consequences. Although this type of credit inquiry can come at a cost, it is preferable that consumer credit inquiries of the present invention be a consumer inquiry.

Because the present invention acts on behalf of consumer's the administrator of the present invention can be considered an agent of the consumer. Acting as an agent of the consumer, the consumer's credit files can be retrieved based upon a consumer inquiry, because the purpose of the inquiry is for the consumer's primary benefit. According to the present invention, the system and method do not provide the customer's credit information to merchants or other entities, unless a consumer wishes to enter a contract with a particular entity, as described below. Therefore, unlike prior art online web sites, which retrieve a consumer's credit report, as a merchant or promotional inquiry, and supply the credit report to merchants, the system and method of the present invention enable an agent of consumers consumer inquiries to their credit reports. Furthermore, according to the present invention the credit inquiries into a consumer's credit files stored with one or more credit bureaus may be real-time inquiries including up to the date credit history information regarding the consumer's credit.

Pre-Approved Offer Function of the Present Invention

Figure 4:
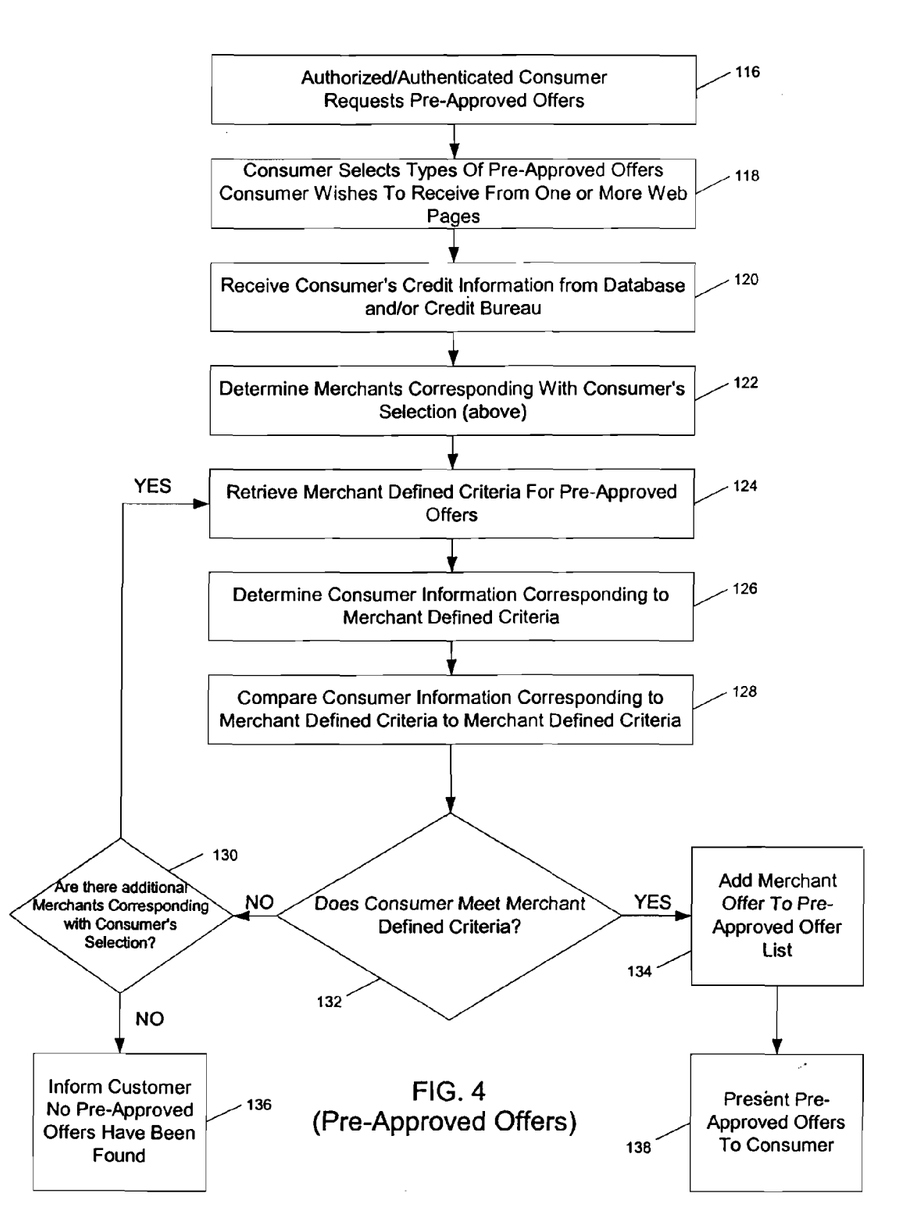
FIG. 4 shows a flowchart illustrating the pre-approved offer function of the present invention, according to one embodiment of the present invention.

Referring now to FIG. 4, a flow chart illustrating the pre-approved offer functions performed by the systems and methods of one embodiment of the present invention is illustrated. As described above, after a consumer has been authenticated, and a consumer profile has been created for that consumer, the consumer can select a number of options via a graphical user interface. One of the options the consumer may select is pre-approved offers (see block 116), which can be selected via a button located on a web page. This selection may be made from any one of a number of homepages, and can occur after the user has selected one of the other options, such as the receipt of personalized credit information, discussed above. The purpose of pre-approved credit offers is to offer consumers an exhaustive list of merchant offers that the user may wish to accept pre-approved offers from. According to one aspect of the present invention, the merchants do not obtain the identity or credit information of the specific consumers they are making offers to. Rather, the system and method of the present invention receives offer criteria from merchants, retrieves customer credit information corresponding to these offer criteria, and determines the offers each consumer is pre-approved for. In this manner consumers can anonymously receive pre-approved offers for auto loans, home mortgage loans, credit cards, or any other offers for sale or loan, from a plurality of merchants.

According to one aspect of the invention, after a consumer's account is established, and after indicating that the consumer wishes to receive pre-approved offers, the consumer can be directed to a webpage having a plurality of selections that the consumer can selectively choose to define the type or types of pre-approved offers the consumer wishes to receive (see block 118). For example, the webpage can include an exhaustive list of any number of offer types, divided into categories such as credit card offers, auto loan offers, home mortgage offers, wireless telephone offers, and the like. It will be appreciated that the categories can be more specifically defined so that a consumer can choose from more specific offers. For instance, the consumer may be able to select that the consumer wishes to receive American Express Credit Card offers rather than Visa or Mastercard offers. Alternatively, the selection of offers can be implemented through the use of multiple webpages, wherein each webpage contains a more specific subset or category of the previous category selected by the consumer. The consumer may make their selections using any suitable means. For example, where the webpages enable the consumer to check multiple selections, the consumer may do so utilizing a mouse. After the consumer completes the selection of offers the user wishes to receive, the user can submit the consumer's selection via a submit button.

After a consumer's category (or subset) selections have been received, credit history data relating to the consumer is retrieved (see block 120) so that pre-approved offers for that consumer can be determined. This can occur according to the method described with respect to the E-Scoring description, above. However, where a consumer's personalized credit history data has already been received from a credit bureau and/or one or more data sources, and stored in a consumer database, the personalized information can be retrieved from the database storing that data (wherein that database is preferably local to the system 5). This prevents unneeded inquiries from being submitted to the credit bureaus or information sources. This can be important where consumer profile inquiries cost money. The database containing the consumer's personalized credit information may be updated at any interval established by the system administrator, such as every time a consumer wishes to receive pre-approved offers and a month has passed from the last consumer credit update. Furthermore, it should be appreciated that because the consumer's personalized credit profile can contain data other than a credit report, such as personalized information (i.e., salary), this information may also be updated periodically or according to predefined intervals or terms.

After receiving consumer personalized credit history from one or more sources, the system and method of the present invention determines the pre-approved offers the consumer is approved for. To this end, the present invention first determines the merchants that correspond to the selections initially made by the consumer (see block 122). For example, if the consumer chose to receive offers only from credit card merchants, the systems and methods of the present invention will only determine any pre-approved offers from credit card merchants, rather than from all merchants as a whole. After the appropriate merchants are selected, the systems and methods of the present invention retrieves merchant defined criteria (see block 124) for determining which offers from those merchants the consumer will be pre-approved, and if applicable, under what terms. The merchant defined criteria can be stored in a local or non-local database, or can be retrieved directly from the merchant via any well known communication channels, such as the Internet.

The merchant defined criteria can include any combination of prerequisites the merchant requires to be fulfilled before a pre-approved offer can be made to consumers. For example, a merchant offering a credit card having a particular interest rate may only require consumers to have a Beacon score (a FICO score utilized by Equifax) greater than 700 before a pre-approved offer is made. The merchant would submit this criteria to the system of the present invention, which will then compare the Beacon score of the consumer to that required by the merchant. If the consumer's Beacon score is greater than 700, the system and method of the present invention will identify the merchant and offer the pre-approved credit card to the consumer. If the consumer's Beacon score falls below the minimum required by the merchant, the merchant offer will not be presented to the consumer. It will be appreciated that the merchant's offering criteria may be dependent upon a number of the consumer's credit criteria, which the system of the present invention stores in the consumer profile. As such, merchants may offer pre-approved offers to consumers meeting a number of pre-set criteria, including combination of items such as a Beacon score, number of merchant inquiries made in the last year, number of credit cards or outstanding balance, and/or any other criteria. The system and method of the present invention retrieves the necessary criteria from the consumer's profile and determines whether the consumer meets the criteria (see blocks 126 and 128).

Each consumer requesting pre-approved offers can be analyzed with respect to multiple merchants. Therefore, according to one aspect of the present invention, a consumer that wishes to receive offers for auto loans and credit cards may receive offers from a plurality of companies each offering the consumer a pre-approved auto loan or credit card offer having preset and varying rates. The number and variety of offers enables the consumer to choose the offer that will best suit the consumer. Another advantage of the present invention is that the offers are made to the consumer although the consumer is completely anonymous to the merchant. Because the system acts as the consumer's agent, consumers can receive offers from countless merchants without fear that merchant credit checks will be run, or that the merchants will use the customer's data for future solicitations. If the consumer wishes to turn down all of the pre-approved offers, the consumer can do so without the consumer's information being divulged.

After the anonymous pre-approved offers are determined by the system of the present invention, the offers can be presented to the consumer on a web page in a convenient fashion so that the consumer can select the most appropriate pre-approved offer. The offers are preferably listed together on one page so that the consumer can compare the terms of each individual offer to determine the most favorable offer (see blocks 132, 134, 138). Where no offers are located however, the consumer will be informed that no pre-approved offers have been found (see blocks 130, 132, 136).

Pre-approved offers may be listed or presented in a number of different manners. Most preferably, the offers are displayed using a web-based representation of the pre-approved offers. According to one aspect of the present invention, merchants who wish their offer to be displayed most prominently among the other offers may pay a premium price to the system administrator. With a premium payment the merchant's offer may be displayed at the top of other pre-approved offers, or may be displayed larger or in a more desirable manner (i.e., a more attractive or colorful banner) than the other offers. Alternatively, the system of the present invention could allow the consumer to rank the offers according to one or more fields, such as the cheapest offer, or most popular offer among other consumers. According to yet another aspect of the invention, the offers may be rated independently by the system of the present invention according to an algorithm which analyzes the offer or offers that best suit the individual consumer based upon one or more of the consumer's credit profile. For example, where the consumer's credit profile identifies that the consumer owns a Visa credit card, and where the consumer has selected to receive pre-approved offers from credit card merchants, the system may present Mastercard, American Express or Discover offers in a more prominent manner than Visa offers, due to the fact that the consumer already has a Visa card.

According to yet another aspect of the invention, before receiving pre-approved offers from merchants, the consumer may select preference criteria which is matched against merchant offers. Therefore, any merchant offers not meeting the pre-established consumer criteria will not be displayed to the consumer. The consumer may enter this predetermined criteria at the same time the consumer selects the types of merchants the consumer wishes to receive offers from, as discussed above. For example, after the consumer selects credit card merchants to receive offers from, the consumer can enter preference criteria such as the minimum interest rate the consumer may wish to view. This will allow the consumer selecting that the preference criteria to limit the number of offers the consumer receives.

Each pre-approved provided to the consumer can include selections that enable the consumer to accept the pre-approved offer or find out more abut the pre-approved offer. Additionally, the consumer should be able to exit the pre-approved offer pages without further action. Each of these functions could be enabled by a plurality of buttons located on the webpage listing the offers. Where the consumer wishes to find out more about an offer, it is preferred that the consumer can choose to click on a button or hyperlink which will lead the user to a page that presents the user with additional information about the offer. This additional information can include the terms of the contract, should the user wish to enter the contract with the merchant.

Consumers can also select to accept a pre-approved offer from a merchant. Where this occurs, the consumer's information can be sent directly to the merchant from the system so that the merchant can establish an account with the consumer. This can occur on a real-time basis. After establishing the account with the merchant, the consumer may instantly receive an account number from that merchant so that the consumer can immediately use the account. Alternatively, the system may direct the user to the merchant's web page or a separate web page maintained by the system of the present invention so that the consumer can provide any additional information required to enter the contract, and accept via consenting buttons that the consumer accepts the terms of the pre-approved offer.

Advantageously, once a consumer accepts a pre-approved offer from a merchant, the systems and methods of the present invention can evaluate the impact of the new account on the consumer's credit, so that the consumer's credit is updated on a real-time or near real-time basis. The consumer's credit update is therefore unlike conventional consumer credit updates, which can take 30 days or more after a consumer has opened a new account. As a result, merchants using the systems and methods of the present invention can base their lending and transacting decisions on consumer credit information which is updated each time the consumer accepts a pre-approved account. This offers an advantage to merchants, who may otherwise run the risk of providing credit to consumers whom have taken recent actions (or have not taken recent actions, such as the failure to pay bills due) which negatively affect consumer's credit without the merchant's knowledge because the consumer's credit information is not updated on a real-time basis, as in the present invention.

Therefore, it will be appreciated that present invention processes merchant offers on behalf of consumers without merchant involvement. Furthermore, the present invention maintains consumers anonymity until the consumer actively accepts a merchant offer.

E-Privacy Function of the Present Invention

Figure 5:
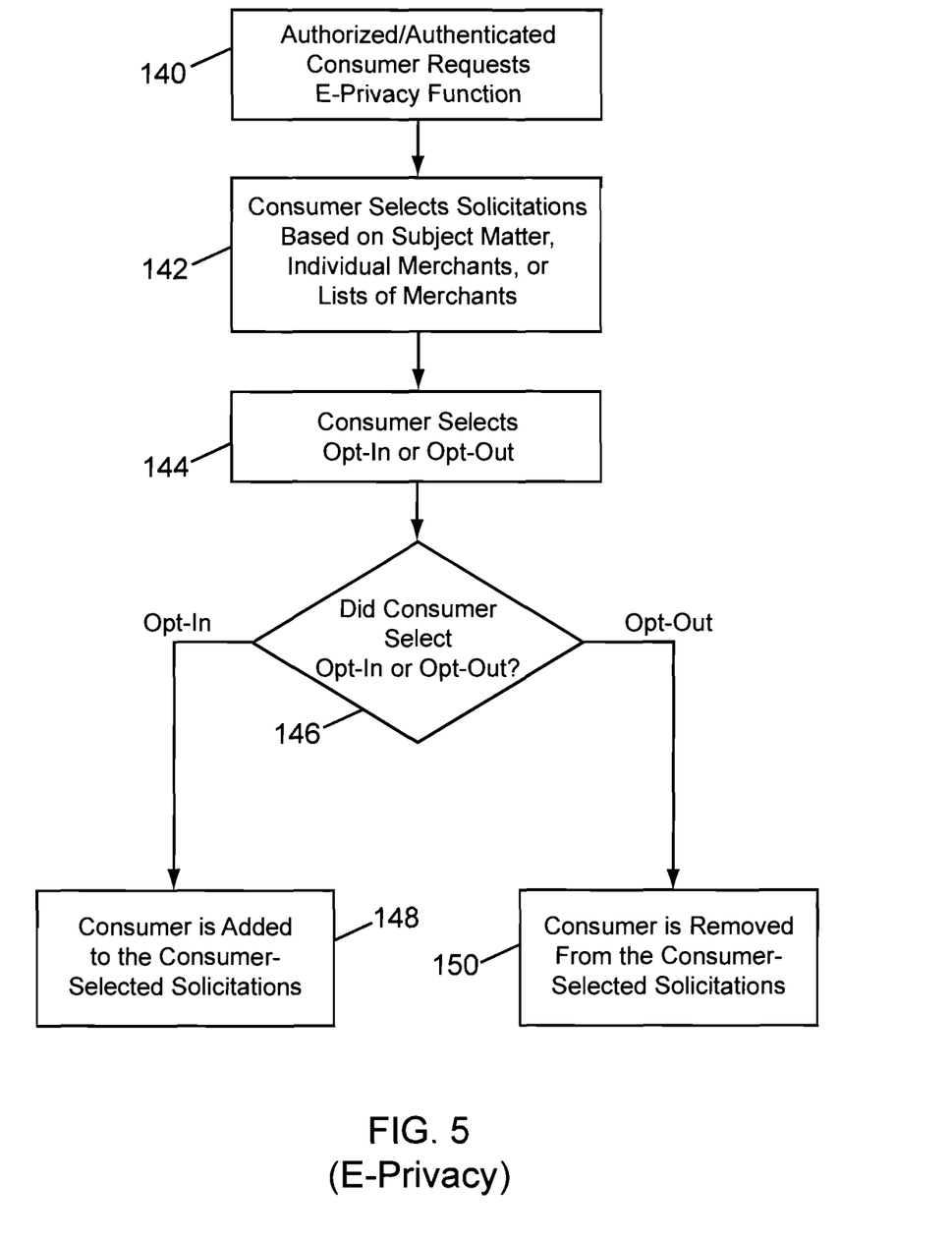
FIG. 5 shows a flowchart illustrating the e-privacy function of the present invention, according to one embodiment of the present invention.

Referring now to FIG. 5, a flow chart illustrating the E-privacy function performed by the systems and methods of one embodiment of the present invention is illustrated. This function of the present invention allows consumers having established accounts with the system of the present invention to opt-out of or opt-into targeted marketing programs that distribute targeted marketing items from a plurality of merchants. Like the above functions of the present invention, a consumer can select this function using a graphical user interface, such as a web page having buttons, after the user is identified by having an account with the system of the present invention (see block 140).

According to one aspect of the invention, a consumer can select via a webpage to selectively opt-out of or into solicitation lists. A consumer who initially selects the e-privacy function of the present invention will be forwarded to one or more webpages that identify solicitations by subject matter, individual merchants, or an inclusive list of particular merchants. The consumer can then select one or more of the solicitations the user wishes not to receive (i.e., opt-out) or receive (i.e., opt-into) based upon the solicitation subjects previously identified (see block 142). For example, the user can select credit card offers and long distance telephone offers using a pre-established list offered by the system to the consumer. After making the selection(s), the consumer can then select an opt-out button on the web page (see block 144). Alternatively, the consumer may opt-into solicitation lists if the consumer wants to receive solicitations from a particular type of merchant (see block 144). After receiving the consumer's selection to opt-out or opt-into specific solicitations, the systems and methods of the present invention can communicate with one or more entities to remove add the consumer from solicitation lists (see blocks 146, 148, 150). For example, the system of the present invention could automatically remove the consumer from direct marketing association (DMA) lists and could add the consumer to state 'do not call' lists.

Proof Positive Function of the Present Invention

Figure 6:
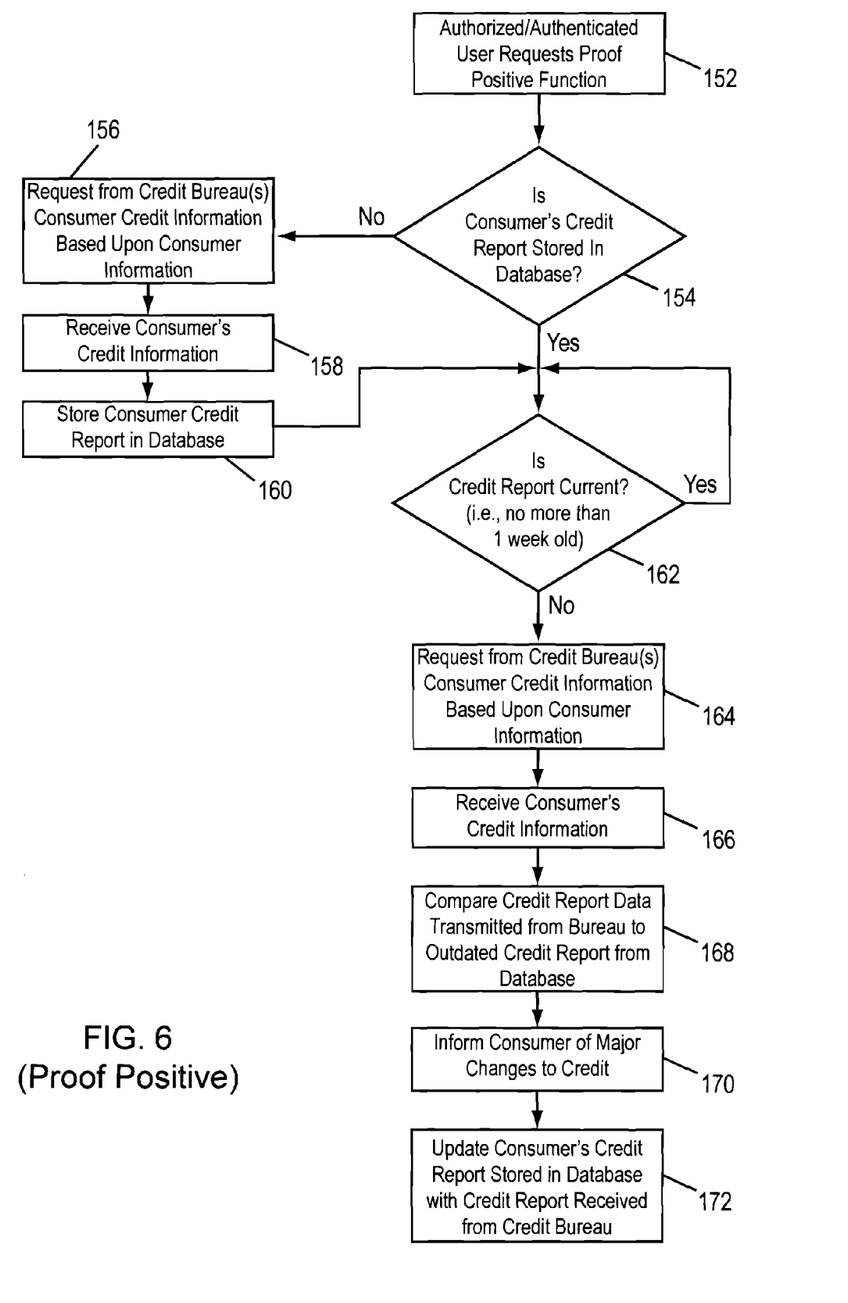
FIG. 6 shows a flowchart illustrating the proof-positive function of the present invention, according to one embodiment of the present invention.

Referring now to FIG. 6, a flow chart illustrating the proof-positive function performed by the systems and methods of one embodiment of the present invention is illustrated. This function of the system and method of the present invention monitors credit report activity of registered consumers. The present invention enables consumer up to the date reports concerning any number of changes associated with the user's credit report. Like the above functions, this function (hereinafter referred to as 'proof positive') can be selected by the consumer from a homepage associated with the system, as is well known to those of skill in the art (see block 152).

To detect changes in the credit report of the consumer the system of the present invention must initially request the credit report of the consumer and receive the consumer's credit report from one or more credit bureaus, as described above. The user's credit report can be requested immediately after the user requests the proof positive function of the present invention. Alternatively, as states above, the user's credit report may initially be pulled from a database storing consumer information where the consumer's credit report has been previously received by the system and stored in a database (see blocks 154, 156, 158, 160).

Where the consumer's report is not current (for example, greater than 1 week old), the systems and methods of the present invention requests updated consumer information from the credit bureau (see blocks 164, 166). After receiving this updated credit information, it is compared to the user's stored credit report to determine any changes in the stored report (see block 168). One purpose of this function of the present invention is to provide consumers with identity theft protection and general updates regarding changes to the consumer's credit. Once a consumer is registered with the system, a check can be done on a periodical basis, such as weekly (as noted above), biweekly or monthly. Information that can be checked can include the number of inquiries made regarding a consumer's credit, the number of accounts open, the address, and revolving balance. For example, if a revolving balance is changed by a drastic amount, or if consumer's score goes up or down over a short period of time, the consumer can be notified of these changes (see block 170). The system can also do more than make differential snapshots of changes to a consumer's credit profile. The system and method of the present invention can inform the consumer of major changes to the consumer's report, along with a summary of how the specific change can affect the consumer's credit. The consumer may be notified via access to a particular webpage maintained by the system, or may receive updates via E-mail or any other communication means, such as mail. After receiving the updated credit report, the system can update the consumer's credit report in the system (see block 172) so that future changes to the consumer's credit report can be determined.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A computer-implemented method for providing a consumer with personalized credit-related information based on credit history data of the consumer, comprising:

electronically receiving a request from the consumer for personalized credit-related information;

transmitting to a credit bureau, by a control module executed on a computer in response to the request from the consumer, an inquiry for credit history data relating to the consumer;

receiving credit history data on the consumer in response to the inquiry;

receiving a consumer-related record via at least one network, the consumer-related record being associated with the consumer and received from at least one database other than a database associated with the credit bureau;

generating, by the control module executed on the computer, a summary report of personalized credit-related information based on the credit history data and the consumer-related record associated with the consumer, the summary report including a credit score and an explanatory statement suggesting at least one step to improve the credit score, wherein the explanatory statement suggesting at least one step to improve the credit score is based on the credit history data and the consumer-related record associated with the consumer; and transmitting, by the control module executed on the computer, the summary report to the consumer.

2. The computer-implemented method of claim 1, further comprising creating an account associated with the consumer to establish an agent relationship with the consumer.

3. The computer-implemented method of claim 1, wherein transmitting an inquiry includes transmitting a Fair Credit Reporting Act Consumer Inquiry for the consumer to the credit bureau.

4. The computer-implemented method of claim 1, wherein generating the summary report includes generating the credit score based on the credit history data.

5. The computer-implemented method of claim 1, wherein receiving the request of the consumer includes authenticating the consumer.

6. The computer-implemented method of claim 1, wherein transmitting the summary report to the consumer comprises transmitting the summary report to a borrower.

7. The computer-implemented method of claim 1, wherein the inquiry is a consumer inquiry that does not count against the credit score.

8. The computer-implemented method of claim 5, wherein authenticating the consumer comprises:
proving a multiple-choice question to the consumer, the multiple-choice question being based on credit information of the consumer;
receiving a response to the multiple-choice question; and
authenticating the consumer based on the response.

9. A computer-readable memory on which program code is stored thereon, which when executed cause a processor to perform actions, the actions comprising:
receiving a request from the consumer for personalized credit-related information;
transmitting to a credit bureau, in response to the request from the consumer, an inquiry for credit history data relating to the consumer;
receiving credit history data on the consumer in response to the inquiry;
receiving a consumer-related record via at least one network, the consumer-related record being associated with the consumer and received from at least one database other than a database associated with the credit bureau;
generating a summary report of personalized credit-related information based on the credit history data and the consumer-related record associated with the consumer, the summary report including a credit score and an explanatory statement suggesting at least one step to improve the credit score, wherein the explanatory statement suggesting at least one step to improve the credit score is based on the credit history data and the consumer-related record associated with the consumer; and
transmitting the summary report to the consumer.

10. The computer-readable memory of claim 9, wherein the actions further comprise creating an account associated with a consumer to establish an agent relationship with the consumer.

11. The computer-readable memory of claim 9, wherein transmitting to the credit bureau, in response to the request from the consumer, the inquiry for credit history data relating to the consumer comprises transmitting a Fair Credit Reporting Act Consumer Inquiry for the consumer to the credit bureau.

12. The computer-readable memory of claim 9, wherein generating the summary report of personalized credit-related information comprises generating the credit score based on the credit history data.

13. The computer-readable memory of claim 9, wherein the actions further comprise authenticating the consumer.

14. The computer-readable memory of claim 13, wherein authenticating the consumer comprises:
providing a multiple-choice question to the consumer, the multiple-choice question being based on credit information of the consumer;
receiving a response to the multiple-choice question; and
authenticating the consumer based on the response.

15. The computer-readable memory of claim 9, wherein transmitting the summary report to the consumer comprises transmitting the summary report to a borrower.

16. The computer-readable memory of claim 9, wherein the inquiry is a consumer inquiry that does not count against the credit score.

* * * * *